Figure 1:
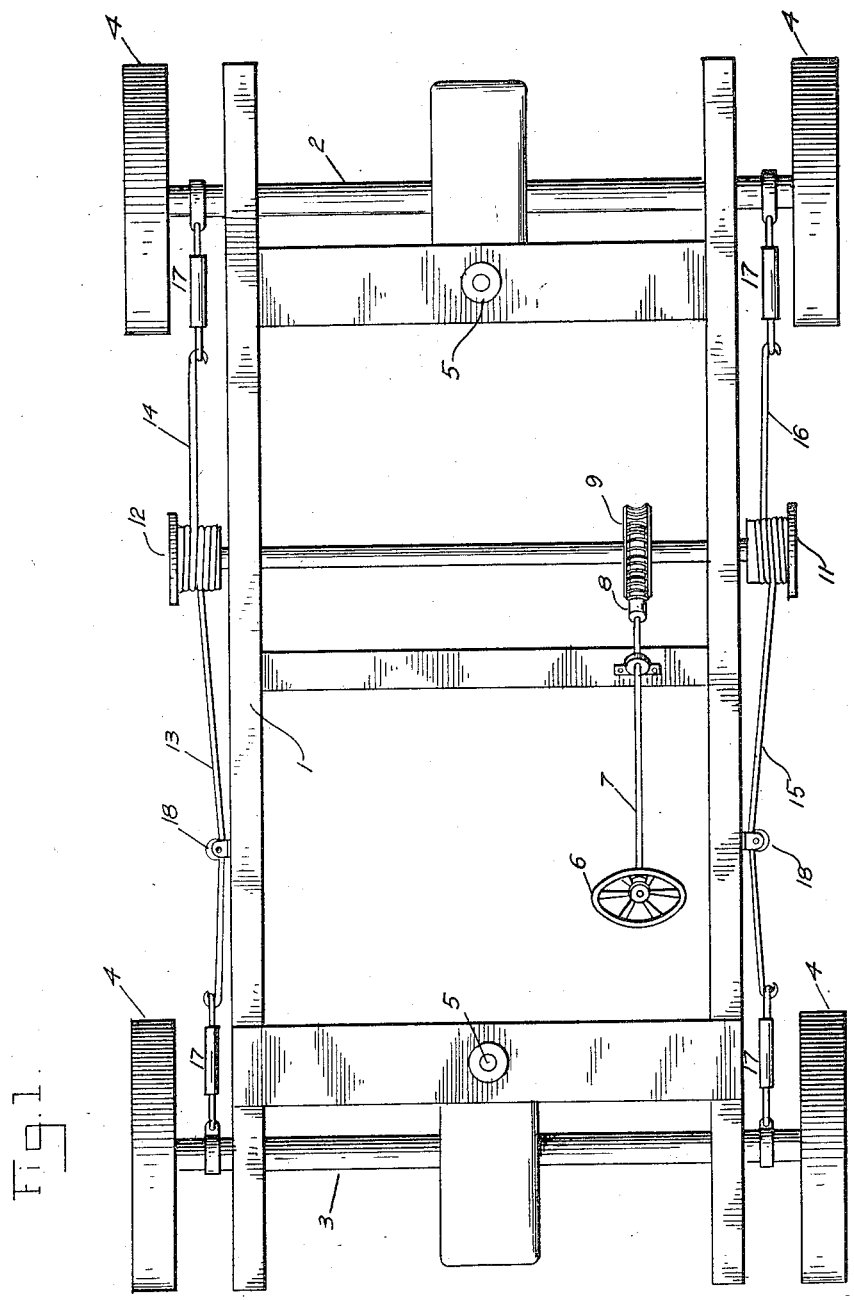

R. W. PETERSON.
STEERING GEAR.
APPLICATION FILED JUNE 17, 1912.

1,069,720.

Patented Aug. 12, 1913.
2 SHEETS—SHEET 1.

Witnesses

Inventor
Raford W. Peterson
by M. R. Seely.
Atty.

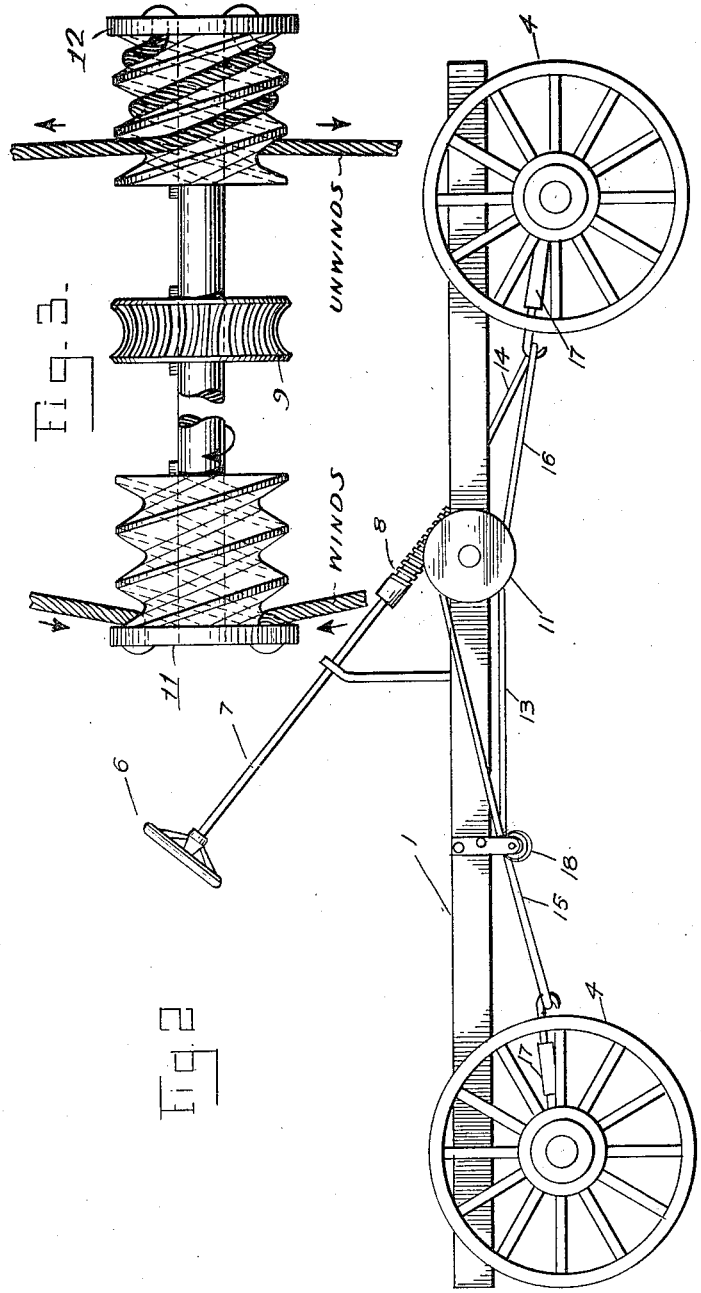

UNITED STATES PATENT OFFICE.

RAFORD W. PETERSON, OF SANTA ROSA, CALIFORNIA.

STEERING-GEAR.

1,069,720.  Specification of Letters Patent.  Patented Aug. 12, 1913.

Application filed June 17, 1912. Serial No. 704,200.

*To all whom it may concern:*

Be it known that I, RAFORD W. PETERSON, a citizen of the United States, residing at Santa Rosa, county of Sonoma, State of California, have invented certain new and useful Improvements in Steering-Gear, of which the following is a specification.

My invention relates to steering gear and particularly to its use in motor driven vehicles.

The object of my invention is to produce a multiple wheel steering device that will render it unnecessary to turn the front wheels as much as heretofore, and at the same time to facilitate the turning of sharp curves. It also does away with the complicated mechanism of the ordinary steering knuckle, allowing the whole axle to be moved on a common center.

My invention is illustrated in the accompanying drawings, in which:—

Figure 1, is a plan view of a chassis; Fig. 2, is a side elevation of same; Fig. 3, is a detail of the cross shaft carrying the worm wheel and double threaded spools.

1 is the frame of the chassis. Mounted on the front and rear axles 2 and 3 are the wheels 4, 4.

5, 5 are the king bolts or centers on which the axles are turned.

6 is a steering wheel mounted on a shaft 7 and carrying a worm 8.

9 is worm gear or wheel rigidly mounted on the cross shaft 10 and driven by the worm 8. Cross shaft 10 carries on both ends double threaded spools 11 and 12. The cables 13, 14, 15 and 16 control the wheels.

17, 17 are turnbuckles for adjusting the cables.

18, 18 are guide pulleys or sheaves for keeping the cable close to the frame, thereby giving the rear wheels a greater radius. Each of these pulleys 18 is provided with two parallel spiral grooves, one cable being secured at the outer end of each groove, so that as the two cables wind upon or unwind from each spool they are prevented from winding upon each other, which would cause improper steering of the vehicle. As they occupy separate channels, they are also prevented from rubbing against each other, thereby preventing abrasion and wear.

The operation of my invention is as follows: The turning of the wheel 6 to the right or left imparts a forward or reverse motion to the cross shaft 10 by means of shaft 7 which carries the worm 8. This in turn drives the worm gear 9 which is rigidly mounted on said shaft. It will be readily seen that by the double threaded spools 11 and 12 being rotated by the shaft 10 in a forward direction the cables 15 and 16 would be wound up and shortened while the cables 13 and 14 would be unwound and lengthened. This causes the axles 2 and 3 to move on their common centers 5, 5, into position allowing the machine to turn to the right. Therefore a reverse motion imparted to the spools 11 and 12 would cause the cables 13 and 14 to be wound up and shortened and the cables 15 and 16 to unwind and lengthen, causing the axles 2 and 3 to move on their centers 5, 5 into position for allowing the machine to turn to the left. The turnbuckles 17, 17 adjust and take up the slack of the cables. The sheaves 18, 18 hold the cables 13 and 15 close to the frame, allowing the axle 3 to be operated to its full radius without the wheels 4, 4 coming into contact with and cutting the cables.

Having thus described my invention, what I claim as new and desire to secure by Letters Patent, is:—

In a steering gear and in combination, a frame, front and rear pivotally mounted axles, a cross shaft journaled in the frame, means for turning said shaft, a spool at each end of said shaft having each a pair of spiral grooves, and a pair of cables connected to each spool, the ropes of each pair being connected to the spool at the ends of separate channels, so as to be kept separate in winding and unwinding thereon, the opposite ends of said cables being connected with the outer ends of the front and rear axles respectively.

In testimony whereof, I affix my signature in presence of two witnesses.

RAFORD W. PETERSON.

Witnesses:
O. A. EGGERS,
WETH GRANT MURRAY.

Copies of this patent may be obtained for five cents each, by addressing the "Commissioner of Patents, Washington, D. C."